OPTO-ELECTRONIC NETWORK

INVENTORS
FREDRIK M. BEEFTINK
JOHANNES G. VAN SANTEN
BY
Frank R. Trifari
AGENT

INVENTORS
FREDRIK M. BEEFTINK
JOHANNES G. VAN SANTEN
BY
Frank R. Jeifari
AGENT

United States Patent Office 3,213,283
Patented Oct. 19, 1965

3,213,283
OPTO-ELECTRONIC NETWORK

Fredrik Marten Beeftink, Utrecht, and Johannes Gerrit van Santen, Emmasingel, Eindhoven, Netherlands, assignors to North American Philips Company, Inc., New York, N.Y., a corporation of Delaware Filed Jan. 17, 1963, Ser. No. 252,079
Claims priority, application Netherlands, Jan. 26, 1962, 274,025
3 Claims. (Cl. 250—209)

This invention relates to opto-electronic networks, the term generally applied to networks or circuits employing electroluminescent elements and photoconductors in combination, with optical coupling between selected elements and photoconductors. Information supplied to such a circuit in the form of an electrical or optical signal may be transmitted from one part of the circuit to another by optical means. An advantage of these circuits is that the transmission of a signal does not require the use of any direct electrical coupling between the parts of the circuit. Opto-electronic networks comprising a plurality of identical sections coupled together by optical means are known in the art, each section including one or more branches each of which is connected to two through-conductors with the luminescent elements and photoconductors of each branch being connected together electrically. Such a network may constitute, for example, a shift register supplied by electrical or optical pulses.

In a known practical embodiment of such an opto-electronic network designed as a shift register or counter, the luminescent elements are provided on one side of a transparent and insulating carrier and the photoconductors are provided on the other side thereof. The optical coupling between a luminescent element and a photoconductor located opposite thereto is effected through the transparent carrier. This structure has the disadvantage that the minimum spacing between a luminescent element and a photoconductor optically coupled therewith is determined by the smallest thickness which may be given to the carrier; this thickness has a minimum determined by the required mechanical stability or rigidity of the assembly. Consequently, the spacing between two photoconductors optically coupled to different luminescent elements often has to be larger than would be necessary if the sole restriction were the dimensions of the photoconductive elements and their mutual electrical separation. Furthermore, providing different kinds of components on one carrier requires different treatments thereof, with the possibility that the last treatment provided may be injurious to the components previously treated.

It is a primary object of the invention to provide an opto-electronic network composed of a plurality of identical sections, each including electroluminescent elements and photoconductors, in which required electrical and optical coupling between components may be efficiently and reliably achieved without being unduly restricted by the mechanical or structural requirements.

In accordance with the invention, two separate carriers are provided which are spaced apart by a fixed distance, with the luminescent elements being located on one side and the photoconductors on the other of the adjacent sides of the carriers. A direct connection between different kinds of components included in the same branch is established in each case by means of a conductive member which bridges the space between the two carriers; this member connects a portion formed into a contact face of a line-shaped or strip-shaped conductor connected to one or more photoconductors in this branch, to a similar and opposite portion of an electrode of a luminescent element in the same branch. Due to the location of the luminescent elements and the photoconductors on the adjacent sides of two separate carriers, it is possible to reduce as desired the spacing between luminescent elements and photoconductors which are opposite to and coupled with each other without detrimentally affecting the mechanical strength of the assembly. In addition, scattering of the light from a luminescent element beyond the photoconductors facing it may be substantially avoided. It is also not necessary for the opposing elements to be separated by an insulating solid material in contact with both of them. The interspace may be filled with gas or even exhausted at least at the elements, thus also substantially avoiding the capacitive coupling between opposite elements which occurs in the structure of the prior art. The construction described has the additional advantage that the treatment desirable for the formation of one kind of component may be chosen without taking into account the influence of this treatment upon the other components.

In accordance with one aspect of the invention, the luminescent elements are of planar shape and contain a luminescent material in a binder, these elements being located with local planar electrodes on the side of their carrier and provided, on the side facing the carrier containing the photoconductors, with a planar common electrode spaced from the photoconductors and pervious to the radiation of the luminescent elements; the local electrodes are extended to form contact faces which serve for the electrical through-connections with the photoconductors and are arranged outside the periphery of said common electrode and of the luminescent elements. This has the advantage that the common electrode may act as an electrical shield between the luminescent elements and the photoconductive elements. The current-supply conductors may advantageously be deposited by any of the well-known techniques of printed wiring.

According to a further aspect of the invention, the various photoconductors optically coupled to the same luminescent element are preferably arranged in a line which is approximately transverse to the direction of the through-conductors so that corresponding photoconductors of identical branches which are optically coupled with different luminescent elements are situated in one zone of a series of zones which extend parallel to each other and to the through-conductors and that all the conductors to and from the photoconductors are provided on the surface of the carrier for these elements without insulated crossings. This arrangement ensures, provided that the electrical diagram of the network may be drawn so that there are no crossings or connections which have different potentials and in practice should have to be insulated from one another at such crossings, that in the practical design the supply conductors to the photoconductors may always be positioned on the carrier therefor so that insulated crossings do not occur. In that case the pattern of the supply conductors may be provided on the carrier in a simple manner.

In order that the invention may be readily carried into effect, one embodiment thereof will now be described in detail, by way of example, with reference to the accompanying diagrammatic drawings in which.

Figure 1:
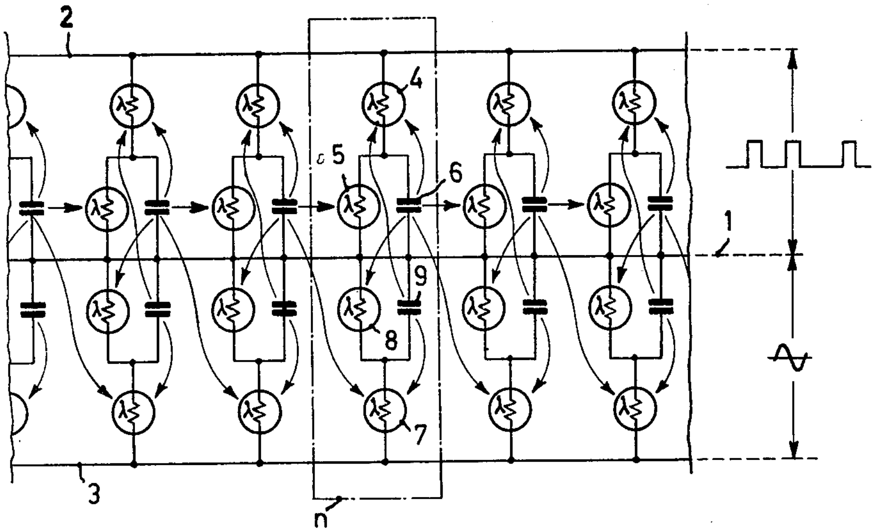
FIGURE 1 shows part of the electrical diagram of an opto-electronic shift register comprising a plurality of identical sections.

FIGURE 1 shows the electrical diagram of part of an opto-electronic shift register comprising a number of identical sections. Each section of the shift register is connected to three through-conductors 1, 2 and 3 and comprises two branches, the first of which is connected to the conductors 1 and 2 and the second of which is connected to the conductors 1 and 3. The first branch includes a photo-conductive element 4 which is electrically connected in series with the parallel combination of photoconductive element 5 and a luminescent element 6. The second branch is identical in structure with the first branch and includes a photoconductive element 7 which is electrically connected in series with the parallel combination of a photoconductive element 8 and a luminescent element 9. FIGURE 1 shows one section outlined by a dot- and dash line and indicated by *n*. The diagram of this section is shown separately in FIGURE 2, the indication of the various elements being provided with the index *n*. The sections are optically coupled and each section also contains an optical coupling between various components thereof. Thus, in each section, the photoconductive element 4 is optically coupled with the two luminescent elements 6 and 9 in the same section. The photoconductive element 5 in a section is optically coupled with the luminescent element 6 in the preceding section, while the photoconductive element 8 is optically coupled with the luminescent element 6 in the same section. The photoconductive element 7 in a section is optically coupled with both the luminescent element 9 in the same section and the luminescent element 6 in the preceding section. Said optical couplings are shown in FIGURE 1 by means of arrows connecting the elements optically coupled. If the number of a section is indicated by the indices $n-1$, $n$, $n+1$, and so forth, the above-mentioned optical couplings may be indicated in FIGURE 2 by the small arrows pointing to the numeral indication of the coupled element. From the index added to the reference numeral of the coupled element it may be deduced in which section the said element is located.

In operation a supply voltage in the form of an alternating voltage is applied to the through-conductors 1 and 3, an information voltage in the form of electrical pulses to be handled by the network is applied to the conductors 2 and 1. Upon the application of an information pulse, a luminescent element 9 located in a section of the network which is radiating at the moment of arrival of the pulse, is extinguished by the luminescent element 6 in this section which luminesces by the action of the pulse voltage; in addition the luminescent element 9 in the next section is caused to radiate. The element 9 in the next section initiates, due to its optical coupling with the photoconductive element 4 in the same section, the transfer of a next pulse to the next section in a similar manner. The branches of the sections including the photoconductive elements 7 and 8 and the luminescent element 9, which are connected to the supply voltage, could be referred to as "holding branches," whereas the branches connected to the information pulse voltage, which include the photoconductive elements 4 and 5 and the luminescent element 6, may be referred to as "transfer branches." When starting from a given initial condition, it may be deduced from the number of the section containing the luminescent element 9 which is radiating after the supply of information pulses, how many information pulses have been supplied. A ring counter is obtained by connecting the end of the network to the beginning thereof.

Figure 2:
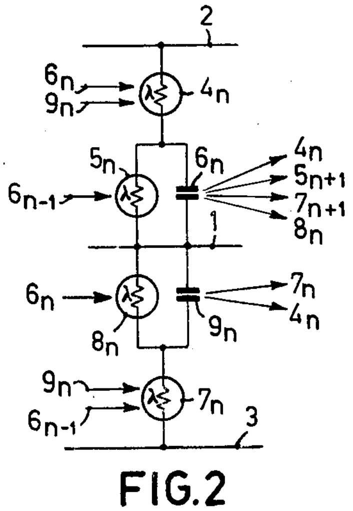
FIGURE 2 shows separately the diagram of one section.
Figure 3:
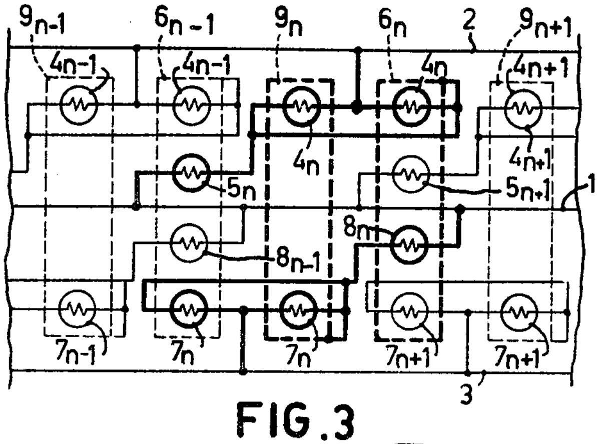
FIGURE 3 shows part of the diagram of FIGURE 1, but differently as regards the relative positioning of the various elements.

The diagram shown in FIGURE 3 is actually identical with that shown in FIGURE 1, but the various elements are grouped differently. The luminescent elements 6 and 9 of the various sections are in this diagram not shown by the symbol of an electrical capacitor as in FIGURES 1 and 2, but represented by an elongated rectangle shown in broken line, which indicates an electrode of such an element and the longitudinal axis of which is tranverse to the direction of the through-conductors 1, 2 and 3. For proper understanding of FIGURE 3 it is mentioned that the counter electrode of the elements 6 and 9 in the various sections is formed by an electrode (not shown) which is common to all these elements and directly connected to the through-conductor 1. Each photoconductive element of the diagram shown in FIGURE 1 which is optically coupled to more than one luminescent element, i.e. the photoconductive elements 4 and 7, is replaced in the diagram shown in FIGURE 3 by two photoconductive elements, electrically connected in parallel and bearing the same reference numeral each being optically coupled with only one luminescent element. Said optical coupling is shown in FIGURE 3 by placing a photoconductive element optically coupled with a luminescent element within the rectangle representing the luminescent element to which this photoconductive element is optically coupled. Arranged in this manner, the positioning of the various elements in the diagram of FIGURE 3 substantially corresponds to that of the elements in the practical embodiment according to the invention of the network of which FIGURE 3 shows the electrical diagram. In this practical embodiment, as will appear hereinafter with reference to FIGURES 4 and 5, the luminescent elements lie in a plane situated behind the plane of the photoconductive elements optically coupled thereto. It should also be noted that the photoconductive elements optically coupled with the same luminescent element are arranged in FIGURE 3 in a line which is more or less transverse to the direction of the through-conductors 1, 2 and 3. It is thus ensured that, if the photoconductive elements and their connections to one another and to the through-conductors 1, 2 and 3 are provided on the same surface of the carrier, crossings of conductors having different potentials do not occur. All of said conductors may thus be provided on the surface of the carrier in one and the same operation. It is to be noted that the step consisting in placing the photoconductive elements optically coupled with the same luminescent element below one another permits of providing a conductor pattern having no insulated crossings of conductors even for circuit arrangements which are more complicated than that shown in FIGURE 3. In fact this may always be realized with said step if the electrical diagram of the network can be drawn in a form analogous to that of FIGURE 1 so that crossings of connections having different potentials do not occur therein. In conclusion, it is mentioned that those elements and their electrical connections which constitute together the *n*th section shown in FIGURE 2 are drawn in thicker lines in FIGURE 3.

Figures 4, 5:
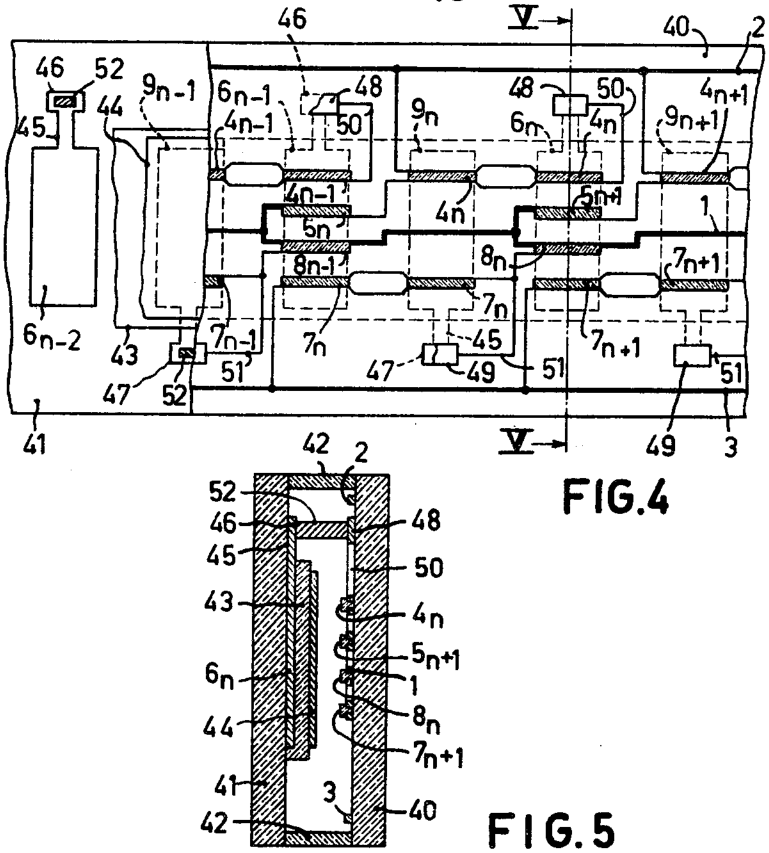
FIGURE 4 is an elevational view of a practical embodiment according to the invention of this network in which several layers at the left-hand side are removed in part.
FIGURE 5 is a cross-sectional view of the practical embodiment shown in FIGURE 4, taken along the line V—V in FIG. 4.

FIGURES 4 and 5 show a practical realisation according to the invention of the opto-electronic shift register the electrical diagram of which is shown in FIGURE 1 as well as FIGURES 2 and 3. This embodiment comprises two parallel plane carrier plates 40 and 41 which are mounted with a fixed spacing between them by means of spacers 42. The plates 40 and 41 consist of insulating material at least on their adjacent sides, while the carrier plate 41 must be transparent if the operating condition of the network is desired to be tested visually or by other optical means. The two plates are preferably of glass and the plate 40 may be opaque, for example of black glass. As an alternative, the plate 40 may be covered with an outer layer which is opaque.

That surface of the carrier plate 40 which is facing the plate 41 carries the photoconductive elements 4, 5, 7 and 8 and their electrodes, their conductive interconnections and the conductive connections to the through-conductors 1, 2 and 3 and also the conductors themselves. That surface of the carrier plate 41 which is facing the plate 40 carries the luminescent elements 6 and 9 of the various sections and their electrodes. A small spacing, preferably not more than about 200 microns, exists between the surface of said luminescent elements and that of the opposing photoconductive elements on the carrier plate 40 by suitable choice of the dimension of the spacers 42 transverse to the planes of the plates. The space between the plates 40 and 41, if the spacers 42 completely close this space, may be filled with an inert gas or even exhausted, in order to prevent any atmospheric influencing of the various elements on the facing surfaces of the plates 40 and 41.

On the surface of the plate 40 facing the plate 41, the electrical connections between the photoconductive elements, their electrical connections to the through-conductors 1, 2 and 3 and the through-conductors themselves constitute a wiring pattern which comprises line-shaped conductors each from 50 to 500 microns wide and which is substantially identical in shape with the wiring pattern in the diagram shown in FIGURE 3. FIGURE 4 shows the wiring pattern such as it would occur if the carrier plate 40 were wholly transparent and not covered with an opaque outer layer. The photoconductive elements indicated by the usual circular symbols in the diagram of FIGURE 3 are positioned in substantially the same position in the practical embodiment shown in FIGURES 4 and 5. They are constituted by thin strips, for example from 1 to 10 microns thick, of sintered photoconductive material, for example of cadmium selenide activated with copper and chlorine, which are locally provided on the surface of the plate 40 and interconnect parts of the line-shaped conductors on the carrier 40 which fulfill the function of electrodes and extend in parallel with a small spacing, for example 300 microns, between them. The photoconductive elements thus formed on the plate 40 are indicated in FIGURES 4 and 5 by the same reference numerals as in the diagram of FIGURE 3. In the practical embodiment shown in FIGURES 4 and 5, the luminescent elements located in FIGURE 3 behind the photoconductive elements and shown as the electrodes 6 and 9 are constituted by the parts of a layer 43 on the carrier plate 41 located opposite the relevant photoconductive elements provided on the carrier plate 40, which parts consist of electro-luminescent material, for example zinc sulphide activated with copper and aluminium and a binder, preferably a glass enamel. The layer 43 is, for example, from 20 to 40 microns thick. Elongated rectangular conductive electrodes, relatively separated and transparent, are provided beneath the layer 43 on the surface of plate 41 in each case opposite a number of photoconductive elements on plate 40 positioned below one another, that is to say in a direction transverse to the conductors 1, 2 and 3, said elongated electrodes being indicated alternately by 6 and 9 in FIGURES 4 and 5 in conformity with FIGURE 3. Said electrodes must be transparent if the output signals of the network are produced by the radiation of the luminescent elements. The portion of the electroluminescent layer 43 which extends over such an electrode constitutes the luminescent element which is optically coupled to the opposing photoconductive elements. The other electrodes of said luminescent elements are constituted by the portions of a continuous transparent conductive layer 44 which are located opposite the individual electrodes of elements 6 and 9 on the surface of the plate 41, said layer 44 being provided on the side of the electroluminescent layer 43 facing the plate 40. Said common electrode 44, which, if the layer 43 contains glass enamel as a binder, may consist of conductive tin oxide but may alternatively be formed by evaporation deposition of, for example, a thin layer of gold, is directly connected to the through-conductor 1 on plate 40, for example at one or each end of the plates 40 and 41.

In the diagrams shown in FIGURES 1, 2 and 3, in each section of the network a direct connection must exist between the common point of the photoconductive elements 4 and 5 and that electrode of the luminescent element 6 which is not connected to the conductor 7 and also a direct connection between the common point of the photoconductive elements 7 and 8 and the corresponding electrode of the luminescent element 9. In the practical embodiment shown in FIGURES 4 and 5, said direct connections are established in a manner such that insulated crossings do not occur in the wiring pattern on the surface of plate 40.

The separate electrodes of elements 6 and 9 alternating with one another and arranged directly on the surface of the carrier plate 41 are extended upwards and downwards respectively with conductive contact faces 46 and 47 respectively, more or less square in shape, which are integral therewith via a narrowed portion 45. Exactly opposite them on the surface of carrier plate 40 there are congruent contact faces 48 and 49 respectively, which form parts of the wiring pattern of this surface and which are electrically connected via line-shaped conductors 50 and 51 respectively, likewise belonging to this wiring pattern, to the electrical through-connection of the photoconductive elements 4, 5 and 7, 8 respectively which are to be directly through-connected to the relevant electrodes 6 and 9 respectively. The opposing contact faces 46 and 48 and also the opposing contact faces 47 and 49 are in each case electrically through-connected by means of an electrically conductive element 52 (FIGURE 5) positioned between the plates 40 and 41 during the mounting thereof. Said elements are preferably deformable, at least during mounting, so that they do not prevent the plates 40 and 41 from being positioned with the spacing given by the spacers 43. If the spacing between the plates 40 and 41 is small, the elements may be obtained, for example, by providing, prior to mounting, a drop of conductive silver paste on each of the opposing contact faces.

The wiring pattern including the contact faces 48 and 49 on the surface of carrier plate 40 and also the pattern of the individual electrodes 6 and 9, together with the contact faces 46 and 47 and the connections 45, on the surface of carrier plate 41 may be formed by using one of the numerous techniques known for the manufacture of so-called printed wiring.

If it is not required to be transparent, such a pattern, for example the wiring pattern on the plate 40, may for instance be obtained by photo-etching a thin gold layer of 0.5 to 5 microns thick, obtained by burning-in a thin layer of gold resinate, provided that the relevant carrier plate may be heated to about 600° C.

The structure of the opto-electronic network according to the invention comprising two carrier plates mounted with a fixed spacing between them makes it possible, as previously mentioned, to reduce as far as possible the distance between a luminescent element and each or the photoconductive element optically coupled therewith so that unwanted optical couplings with other photoconductive elements do not substantially occur.

However, the distance between the plates may be chosen larger and the optical couplings may then be limited to the desired areas by the inter-position of a mask with a suitable pattern of opaque and transparent parts, for example a photographic transparent or a perforated opaque plate, between the plates.

What is claimed is:

1. An opto-electronic network composed of a plurality of identical circuit sections, each section including at least one branch connected to two through-conductors and comprising at least one photoconductor connected in series with the parallel combination of an electroluminescent element and at least one other photoconductor, predetermined photoconductors being optically coupled with predetermined electroluminescent elements, an electroluminescent element and each photoconductor optically coupled therewith being located opposite one another, the luminescent elements being provided on one surface and the photoconductors on the other surface of the adjacent facing surfaces of two separate carriers maintained at a fixed distance from each other, a conductive member bridging the space between the two carriers for connecting predetermined photoconductors and electroluminescent elements of the same branch, a conductor having a contact portion on the surface of the photoconductor carrier connected to one or more photoconductors in the same branch, an electrode of an electroluminescent element in the same branch being located on the surface of the electroluminescent element carrier, said member through-connecting said contact portion to a similar and opposite portion of said electrode, all photoconductors which are optically coupled with the same electroluminescent element being arranged on their carrier on a line substantially transverse to the direction of the through-conductors, corresponding photoconductors of identical branches which are optically coupled with different electroluminescent elements being located in corresponding zones which extend parallel to each other and to the through-conductors, whereby all the conductors connecting the photoconductors are located on the carrier surface without crossing each other.

2. An opto-electronic network composed of a plurality of identical circuit sections, each section including at least one branch connected to two through-conductors and comprising at least one photoconductor connected in series with the parallel combination of an electroluminescent element and at least one other photoconductor, predetermined photoconductors being optically coupled with predetermined electroluminescent elements, an electroluminescent element and each photoconductor optically coupled therewith being located opposite one another, the luminescent elements being provided on one surface and the photoconductors on the other surface of the adjacent facing surfaces of two separate carriers maintained at a fixed distance from each other, the luminescent elements being of planar shape and containing a luminescent material in a binder, said elements being provided with local planar electrodes and with a planar common electrode on the surface facing the photoconductor carrier spaced from the photoconductive elements and pervious to the radiation of the luminescent elements, the local electrodes being extended to form contact faces for the electrical through-connections to the photoconductors, said contact faces being arranged outside the periphery of the common electrode and that of the electroluminescent elements, a conductive member bridging the space between the two carriers for connecting predetermined photoconductors and electroluminescent elements of the same branch, said member through-connecting a contact portion of a conductor on the surface of the photoconductor carrier connected to one or more photoconductors in the same branch to a similar and opposite portion of an electrode of an electroluminescent element in the same branch, said electrode being located on the surface of the electroluminescent element carrier.

3. An opto-electronic network composed of a plurality of identical circuit sections, each section including at least one branch connected to two through-conductors and comprising at least one photoconductor connected in series with the parallel combination of an electroluminescent element and at least one other photoconductor, predetermined photoconductors being optically coupled with predetermined electroluminescent elements, an electroluminescent element and each photoconductor optically coupled therewith being located opposite one another, the luminescent elements being provided on one surface and the photoconductors on the other surface of the adjacent facing surfaces of two separate carriers maintained at a fixed distance from each other, the luminescent elements being of planar shape and containing a luminescent material in a binder, said elements being provided with local planar electrodes and with a planar common electrode on the side facing the photoconductor carrier spaced from the photoconductive elements and pervious to the radiation of the luminescent elements, the local electrodes being extended to form contact faces for the electrical through-connections to the photoconductors, said contact faces being arranged outside the periphery of the common electrode and that of the electroluminescent elements, a conductive member bridging the space between the two carriers for connecting predetermined photoconductors and electroluminescent elements of the same branch, said member through-connecting a contact portion of a conductor on the surface of the photoconductor carrier connected to one or more photoconductors in the same branch to a similar and opposite portion of an electrode of an electroluminescent element in the same branch, said electrode being located on the surface of the electroluminescent element carrier, all photoconductors which are optically coupled with the same electroluminescent element being arranged on their carrier on a line substantially transverse to the direction of the through-conductors, corresponding photoconductors of identical branches which are optically coupled with different electroluminescent elements being located in corresponding zones which extend parallel to each other and to the through-conductors, whereby all the conductors connecting the photoconductors are located on the carrier surface without crossing each other.

References Cited by the Examiner

UNITED STATES PATENTS

| | | | |
|---|---|---|---|
| 2,907,001 | 9/59 | Loebner | 250—227 |
| 2,949,538 | 8/60 | Tomlinson | 250—213 |
| 3,020,410 | 2/62 | Bowerman | 250—213 X |
| 3,086,120 | 4/63 | Fomenko | 250—213 |

RALPH G. NILSON, *Primary Examiner.*

WALTER STOLWEIN, *Examiner.*